(12) United States Patent
Takahashi et al.

(10) Patent No.: US 11,523,454 B2
(45) Date of Patent: Dec. 6, 2022

(54) RADIO COMMUNICATION SYSTEM AND RADIO COMMUNICATION METHOD

(71) Applicant: NTT DOCOMO, INC., Tokyo (JP)

(72) Inventors: Hideaki Takahashi, Tokyo (JP); Tooru Uchino, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 21 days.

(21) Appl. No.: 16/610,347

(22) PCT Filed: May 2, 2018

(86) PCT No.: PCT/JP2018/017558
§ 371 (c)(1),
(2) Date: Nov. 1, 2019

(87) PCT Pub. No.: WO2018/203573
PCT Pub. Date: Nov. 8, 2018

(65) Prior Publication Data
US 2020/0092933 A1    Mar. 19, 2020

(30) Foreign Application Priority Data

May 2, 2017   (JP) .............................. JP2017-091524

(51) Int. Cl.
*H04W 76/16*  (2018.01)
*H04W 80/02*  (2009.01)
*H04W 92/20*  (2009.01)

(52) U.S. Cl.
CPC ............ *H04W 76/16* (2018.02); *H04W 80/02* (2013.01); *H04W 92/20* (2013.01)

(58) Field of Classification Search
None
See application file for complete search history.

(56) References Cited

U.S. PATENT DOCUMENTS

| | | | | |
|---|---|---|---|---|
| 2018/0332657 A1* | 11/2018 | Fan | ........................ | H04W 76/15 |
| 2019/0320417 A1* | 10/2019 | Liu | ........................ | H04W 28/08 |
| 2020/0053809 A1* | 2/2020 | Axelsson | .............. | H04W 76/16 |

FOREIGN PATENT DOCUMENTS

| | | |
|---|---|---|
| EP | 3620028 A1 | 3/2020 |
| EP | 3641444 A1 | 4/2020 |
| EP | 3659391 A1 | 6/2020 |
| WO | 2015/108389 A1 | 7/2015 |

OTHER PUBLICATIONS

NTT DOCOMO, Inc., "Consideration on split bearer for EN-De", 3GPP TSG-RAN WG2 #97bis R2-1703170, Mar. 25, 2017, pp. 1-4 (4 pages).

(Continued)

*Primary Examiner* — Adnan Baig
(74) *Attorney, Agent, or Firm* — Osha Bergman Watanabe & Burton LLP

(57) ABSTRACT eNB (100A) notifies gNB (100B) of a setting location that indicates whether to set in the eNB (100A) or the gNB (100B) a PDCP entity that is a packet data convergence protocol layer entity to be used in a split bearer. The gNB (100B) sets a protocol stack to be used in the split bearer based on the setting location of the PDCP entity notified from the eNB (100A).

8 Claims, 13 Drawing Sheets

(56) References Cited

OTHER PUBLICATIONS

NTT DOCOMO, Inc., "Offline disc on TP for stage2 on split bearer", 3GPP TSG-RAN WG2 #97bis R2-1703937, Apr. 7, 2017, pp. 1-2 (2 pages).
Ericsson, "On the different bearer options", 3GPP TSG-RAN WG2 #97bis R2-1702710, Mar. 25, 2017, pp. 1-3 (3 pages).
3GPP TR 38.804 V14.0.0 "3rd Generation Partnership Project; Technical Specification Group Radio Access Network; Study on New Radio Access Technology; Radio Interface Protocol Aspects (Release 14)", Mar. 2017 (57 pages).
International Search Report issued in corresponding International Application No. PCT/JP2018/017558; dated Jun. 12, 2018 (3 pages).
Written Opinion of the International Searching Authority issued in corresponding International Application No. PCT/JP2018/017558; dated Jun. 12, 2018 (3 pages).
Extended European Search Report issued in counterpart European Patent Application No. 18795171.0, dated Dec. 21, 2020 (11 pages).
Renesas Mobile Europe; "Protocol architecture for dual connectivity"; 3GPP TSG-RAN WG2 Meeting #81bis, R2-131174; Chicago; Apr. 15-19, 2013 (8 pages).
Office Action in counterpart European Patent Application No. 18 795 171.0 dated Apr. 1, 2022 (9 pages).
Office Action in counterpart Japanese Patent Application No. 2019-515749 dated Apr. 12, 2022 (4 pages).
Intel Corporation; "RRC aspects for LTE-NR interworking"; 3GPP TSG-RAN WG2 Meeting #94, R2-163587; Nanjing, China; May 23-27, 2016 (5 pages).

\* cited by examiner

FIG. 12

SCG-ConfigInfo-NR message

```
-- ASN1START

SCG-ConfigInfo-NR-r15 ::=          SEQUENCE {
    criticalExtensions                 CHOICE {
        c1                                 CHOICE(
            scg-ConfigInfo-NR-r15              SCG-ConfigInfo-NR-r15-IEs,
            spare7 NULL,
            spare6 NULL, spare5 NULL, spare4 NULL,
            spare3 NULL, spare2 NULL, spare1 NULL
        },
        criticalExtensionsFuture           SEQUENCE {}
    }
}

SCG-ConfigInfo-NR-r15-IEs ::=      SEQUENCE {
    drb-ToAddModListSCG-NR-r15         DRB-InfoListSCG-NR-r15                         OPTIONAL,
    << omit unrelevant fields >>
    nonCriticalExtension               SEQUENCE {}                   OPTIONAL
}

DRB-InfoListSCG-NR-r15 ::=         SEQUENCE (SIZE (1..maxDRB)) OF DRB-InfoSCG-NR-r15

DRB-InfoSCG-NR-r15 ::=             SEQUENCE {
    eps-BearerIdentity-r15             INTEGER (0..15)
    drb-Identity-r15                   DRB-Identity,
    drb-Type-r15                       ENUMERATED {split, scg}                        OPTIONAL,
    pdcp-Location-r15                  ENUMERATED {mcg, scg}                          OPTIONAL,
}

-- ASN1STOP
```

FIG. 13

SCG-Config-NR message

```
-- ASN1START

SCG-Config-NR-r15 ::=                SEQUENCE {
    criticalExtensions               CHOICE {
        c1                           CHOICE{
            scg-Config-NR-r15        SCG-Config-NR-r15-IEs,
            spare7 NULL,
            spare6 NULL, spare5 NULL, spare4 NULL,
            spare3 NULL, spare2 NULL, spare1 NULL
        },
        criticalExtensionsFuture     SEQUENCE {}
    }
}

SCG-Config-NR-r15-IEs ::=            SEQUENCE {
    scg-RadioConfig-NR-r15           SCG-ConfigPartSCG-NR-r15              OPTIONAL,
    nonCriticalExtension             SEQUENCE {}                           OPTIONAL
}

SCG-ConfigPartSCG-NR-r15 ::=         SEQUENCE {
    drb-ToAddModListSCG-NR-r15       SEQUENCE {
                                     DRB-InfoListSCG-NR-r15                OPTIONAL,
<< omit unrelevant fields >>
    nonCriticalExtension             SEQUENCE {}                           OPTIONAL
}

DRB-InfoListSCG-NR-r15 ::=           SEQUENCE (SIZE (1 .. maxDRB)) OF DRB-InfoSCG-NR-r15

DRB-InfoSCG-NR-r15 ::=               SEQUENCE {
    eps-BearerIdentity-r15           INTEGER (0..15)                       OPTIONAL,
    drb-Identity-r15                 DRB-Identity,
    drb-Type-r15                     ENUMERATED {split, scg}               OPTIONAL,
    pdcp-Location-r15                ENUMERATED {mcg, scg}                 OPTIONAL,
    ...
}

-- ASN1STOP
```

RADIO COMMUNICATION SYSTEM AND RADIO COMMUNICATION METHOD

TECHNICAL FIELD

The present invention relates to a radio communication system and a radio communication method that are capable of configuring a split bearer.

BACKGROUND ART

3rd Generation Partnership Project (3GPP) specifies Long Term Evolution (LTE), and with an aim of further speeding, specifies LTE-Advanced (hereinafter, it is assumed that the LTE includes the LTE-Advanced). Moreover, in the 3GPP, specifications of a successor system of the LTE called 5G New Radio (NR) and the like are being studied.

Specifically, as a type of a bearer in dual connectivity (DC) using a radio base station (eNB) of an LTE system and a radio base station (gNB) of an NR system, a split bearer is stipulated in Non-Patent Document 1.

As a split bearer, Split bearer via MCG that splits from a cell (radio base station) that belongs to a master cell group (MCG), and Split bearer via SCG that splits from a cell (radio base station) that belongs to a secondary cell group (SCG) are stipulated. Furthermore, ordinary bearers (MCG bearer, SCG bearer) that do not split are also stipulated.

On the other hand, as disclosed in Non-Patent Document 2, from the viewpoint of reducing options to be implemented in a user device (User Equipment, UE), integrating the Split bearer via MCG and the Split bearer via SCG and stipulating the same as a unified split bearer is being considered.

PRIOR ART DOCUMENT

Non-Patent Document

Non-Patent Document 1: 3GPP TR 38.804 V14.0.0 Section 5.2.1.2 "Bearer types for Dual Connectivity between LTE and NR", 3rd Generation Partnership Project; Technical Specification Group Radio Access Network; Study on New Radio Access Technology; Radio Interface Protocol Aspects Release 14), 3GPP, March 2017

Non-Patent Document 2: "Consideration on split bearer for EN-DC", R2-1703170, 3GPPTSG-RAN WG2 Meeting 97bis, 3GPP, April 2017

SUMMARY OF THE INVENTION

As explained above, if the Split bearer via MCG and the Split bearer via SCG are integrated and stipulated as a unified split bearer, an entity (PDCP entity) of the packet data convergence protocol layer (PDCP layer) of the UE need not be set for each split bearer and can be set commonly, allowing simplification of the implementation of the UE.

On the other hand, at a radio access network side, specifically, at a radio base station side, whether to set the PDCP entity in a master base station or in a secondary base station needs to be determined each time the split bearer is to be configured. Furthermore, a security key (KeNB) used in the split bearer also differs according to a setting location of the PDCP entity (master base station or secondary base station).

The present invention has been made in view of the above circumstances. One object of the present invention is to provide a radio communication system and a radio communication method capable of appropriately configuring a split bearer in a radio access network even if the Split bearer via MCG and the Split bearer via SCG are integrated and stipulated as a unified split bearer.

A radio communication system according to one aspect of the present invention is a radio communication system (radio communication system 10) that includes a first radio base station (e.g., eNB 100A) and a second radio base station (e.g., gNB 100B), and is capable of configuring a split bearer that goes from a core network (EPC 20 and NGC 25) and splits via the first radio base station or the second radio base station. The first radio base station includes a determining unit (PDCP entity determining unit 120) that determines whether to set in the first radio base station or the second radio base station a PDCP entity that is a packet data convergence protocol layer entity used for the split bearer, and a notifying unit (configuration notifying unit 130) that notifies the second radio base station of a setting location of the PDCP entity determined by the determining unit. The second radio base station includes a setting unit (PDCP entity setting unit 141) that sets a protocol stack used for the split bearer based on the setting location of the PDCP entity notified from the first radio base station.

A radio communication method according to another aspect of the present invention is a radio communication method that is implemented in a configuration in which a first radio base station and a second radio base station are arranged, and is capable of configuring a split bearer that goes from a core network and splits via the first radio base station or the second radio base station. The radio communication method includes notifying, in which the first radio base station notifies the second radio base station of a setting location that indicates whether to set a PDCP entity that is a packet data convergence protocol layer entity used for the split bearer in the first radio base station or the second radio base station; and setting, in which the second radio base station sets a protocol stack to be used in the split bearer based on the setting location of the PDCP entity notified from the first radio base station.

BRIEF DESCRIPTION OF DRAWINGS

FIG. 12 shows a configuration example of SCG-Config-info-NR.

FIG. 13 shows a configuration example of SCG-Config-NR.

MODES FOR CARRYING OUT THE INVENTION

Figure 1:
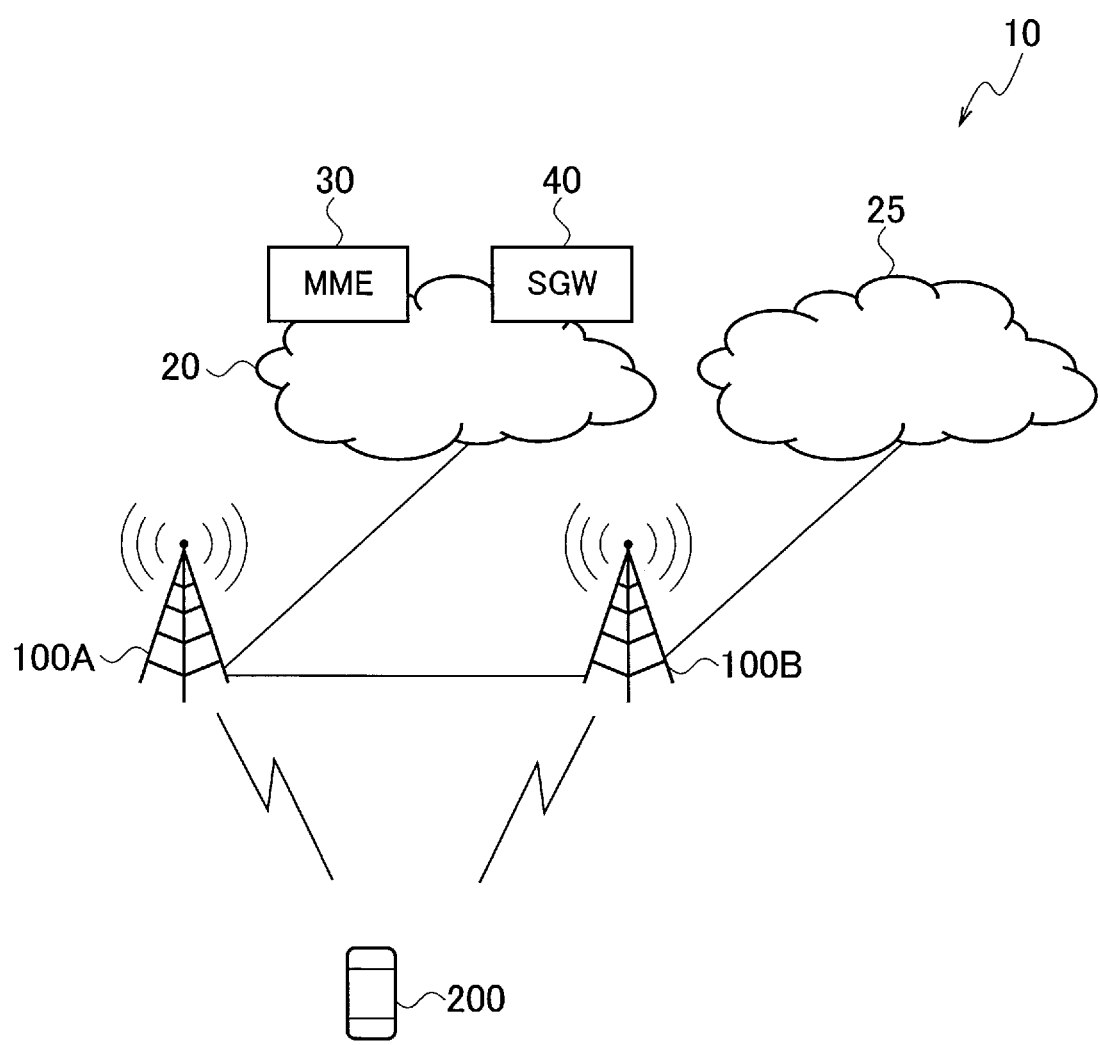
FIG. 1 is an overall structural diagram of a radio communication system 10.

Exemplary embodiments of the present invention are explained below with reference to the accompanying drawings. Furthermore, in the drawings, structural elements having the same function or configuration are indicated by the same or similar reference numerals and the explanation thereof is appropriately omitted.

(1) Overall Structural Configuration of Radio Communication System

FIG. 1 is an overall structural diagram of a radio communication system 10 according to the present embodiment. The radio communication system 10 is a radio communication system that uses the Long Term Evolution (LTE) and the 5G New Radio (NR). Note that, the LTE can be called as 4G and the NR can be called as 5G.

The radio communication system 10 includes Evolved Packet Core 20 (hereinafter, "EPC 20") that is a core network of the LTE (E-UTRA), and NG Core 25 (hereinafter, "NGC 25") that is a core network of the NR. Note that, the NGC 25 can be called as 5GC.

The EPC 20 is connected to Mobility Management Entity 30 (hereinafter, "MME 30") and Serving Gateway 40 (hereinafter, "SGW 40"). Moreover, though not shown in FIG. 1, the NGC 25, too, is connected to nodes (such as Access and Mobility Management Function (AMF) and Session Management Function (SMF)) that include functions corresponding to the MME 30 and the SGW 40.

A radio base station 100A (hereinafter, "eNB 100A") is connected to the EPC 20. The eNB 100A is a radio base station of the LTE system. In the present embodiment, the eNB 100A functions as a master base station. The eNB 100A is appropriately represented as MeNB. In the present embodiment, the eNB 100A constitutes a first radio base station. The eNB 100A belongs to a master cell group (MCG).

A radio base station 100B (hereinafter, "gNB 100B") is connected to the NGC 25. The gNB 100B is a radio base station of the NR system. In the present embodiment, the gNB 100B functions as a secondary base station. The gNB 100B is appropriately represented as SgNB. In the present embodiment, the gNB 100B constitutes a second radio base station. The gNB 100B belongs to a secondary cell group (SCG).

A user device (user equipment) 200 (hereinafter, "UE 200") executes radio communication with the eNB 100A and the gNB 100B. Specifically, the UE 200 executes radio communication with the eNB 100A by using the LTE system, and executes radio communication with the gNB 100B by using the NR system. Particularly, in the present embodiment, the UE 200 can execute dual connectivity (DC) in which the UE 200 is simultaneously connected to the eNB 100A and the gNB 100B.

Moreover, the UE 200 configures a bearer, which is a logical communication path, with the EPC 20 or the NGC 25. Specifically, the eNB 100A configures an MCG bearer with the UE 200. Moreover, the eNB 100A and the gNB 100B configure a split bearer with the UE 200. Furthermore, the gNB 100B can configure an SCG bearer with the UE 200.

The split bearer is a bearer that goes from the core network (EPC 20 or NGC 25) and splits to another radio base station via the eNB 100A or the gNB 100B.

Figure 2A:
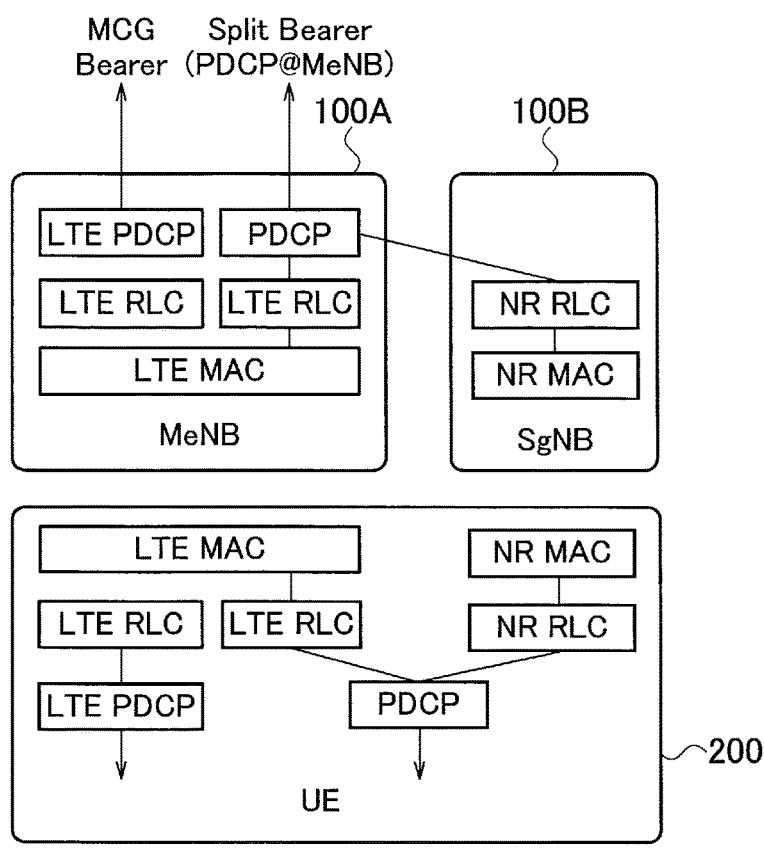
FIGS. 2A and 2B are diagrams showing protocol stacks in eNB 100A, gNB 100B, and UE 200.
Figure 2B:
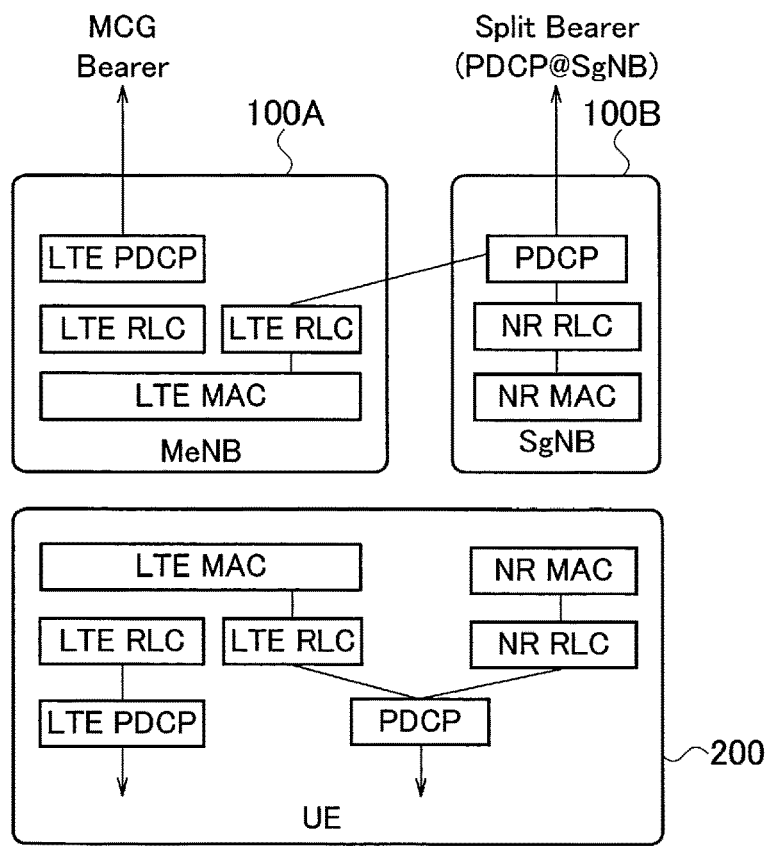

FIGS. 2A and 2B show protocol stacks in the eNB 100A, the gNB 100B, and the UE 200. In the present embodiment, two types of protocol stacks shown in FIGS. 2A and 2B can be set.

As shown in FIG. 2A, for the MCG bearer, the eNB 100A includes a MAC (Medium Access Control) entity (LTE MAC), an RLC (Radio Link Control) entity (LTE RLC), and a PDCP (Packet Data Convergence Protocol) entity (LTE PDCP) for the LTE.

Moreover, for the split bearer (Split Bearer (PDCP@MeNB)), the eNB 100A includes LTE MAC, LTE RLC, and PDCP. As shown in FIG. 2A, the PDCP entity is shared with the gNB 100B side. For the split bearer, the gNB 100B includes NR MAC and NR RLC for the NR. In this manner, in FIG. 2A, the Split Bearer (PDCP@MeNB) splits in the SgNB from the MeNB.

On the other hand, the UE 200, too, includes a protocol stack corresponding to the eNB 100A and the gNB 100B. As shown in FIGS. 2A and 2B, the PDCP entity for the split bearer in the UE 200 is commonly set for the MeNB and the SgNB.

In other words, in the present embodiment, the conventional Split bearer via MCG and the Split bearer via SCG are integrated and one common PDCP entity is used in the UE 200 regardless of a setting location (MeNB or SgNB) of the PDCP entity for the split bearer.

Moreover, as shown in FIG. 2B, the PDCP entity for the split bearer can be set in the gNB 100B. In such a configuration, the gNB 100B includes the NR MAC, the NR RLC, and the PDCP as the split bearer (Split Bearer (PDCP@SgNB)). In this manner, as shown in FIG. 2B, the Split Bearer (PDCP@SgNB) splits in the MeNB from the SgNB.

(2) Functional Block Configuration of Radio Communication System

A functional block configuration of the radio communication system 10 is explained below. Specifically, functional block configurations of the eNB 100A and the gNB 100B are explained below.

(2.1) eNB 100A

Figure 3:
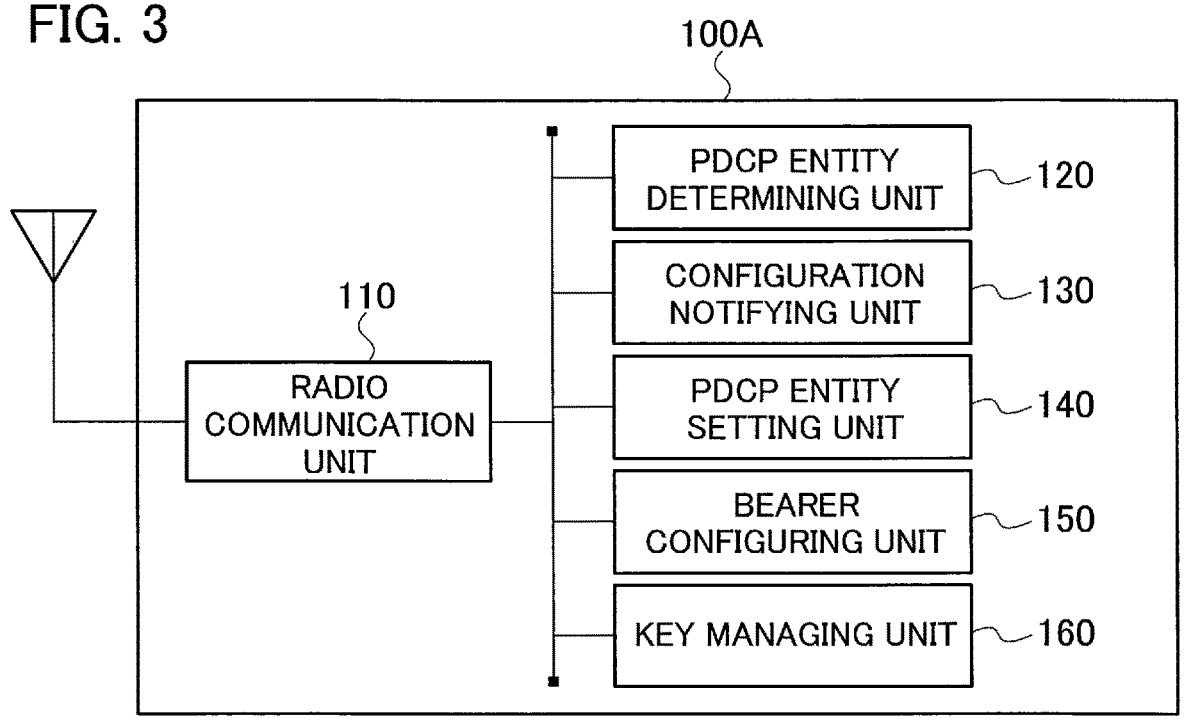
FIG. 3 is a functional block diagram of the eNB 100A.

FIG. 3 is a functional block diagram of the eNB 100A. As shown in FIG. 3, the eNB 100A includes a radio communication unit 110, a PDCP entity determining unit 120, a configuration notifying unit 130, a PDCP entity setting unit 140, a bearer configuring unit 150, and a key managing unit 160.

The radio communication unit 110 executes radio communication using the LTE system. Specifically, the radio communication unit 110 transmits to/receives from the UE 200 a radio signal using the LTE system. User data or control data is multiplexed in the radio signal. Moreover, the control data is transmitted/received via a radio resource control layer (RRC layer) message.

The PDCP entity determining unit 120 determines the setting location of the PDCP entity, which is the entity of the packet data convergence protocol layer.

Specifically, the PDCP entity determining unit 120 determines whether to set the PDCP entity to be used for the split bearer in the eNB 100A (MeNB) or the gNB 100B (SgNB). In the present embodiment, the PDCP entity determining unit 120 constitutes a determining unit.

In other words, the PDCP entity determining unit 120 can determine to set the PDCP entity for the split bearer in the MeNB. Moreover, the PDCP entity determining unit 120 can determine to set the PDCP entity for the split bearer in the SgNB. Whether to set the PDCP entity for the split bearer in the MeNB or the SgNB is determined based on an instruction and the like received from the core network (EPC 20 or NGC 25).

Moreover, the PDCP entity determining unit 120 can determine to modify the setting location of the PDCP entity. Specifically, when the PDCP entity for the split bearer is set in the eNB 100A, the PDCP entity determining unit 120 can determine to modify the setting location of the PDCP entity from the eNB 100A to the gNB 100B.

Furthermore, such a modification of the setting location (relocation) of the PDCP entity is performed between the eNB 100A and the gNB 100B, and is hidden from the UE 200.

The configuration notifying unit 130 notifies the gNB 100B of the settings determined by the PDCP entity determining unit 120. For example, the configuration notifying unit 130 can notify the settings via an interface (Xx-C) provided between the eNB 100A and the gNB 100B. The Xx-C interface can be an extended X2-C interface stipulated for the LTE inter-eNB, or can be a new interface. In the present embodiment, the configuration notifying unit 130 constitutes a notifying unit.

Specifically, the configuration notifying unit 130 notifies the gNB 100B of the setting location of the PDCP entity determined by the PDCP entity determining unit 120. In other words, when it is determined to set the PDCP entity for the split bearer in the eNB 100A, the configuration notifying unit 130 notifies the gNB 100B of settings specifying so.

Moreover, even when it is determined to set the PDCP entity for the split bearer in the gNB 100B, the configuration notifying unit 130 notifies the gNB 100B of settings specifying so.

Furthermore, when it is determined to set the PDCP entity for the split bearer in the gNB 100B, the configuration notifying unit 130 notifies the gNB 100B of a security key to be used in the gNB 100B.

Specifically, the configuration notifying unit 130 passes to the gNB 100B S-KeNB that is generated by the key managing unit 160 by using KeNB, which is a security key retained in the eNB 100A. In other words, the S-KeNB is the security key to be used in the gNB 100B.

The KeNB is generated by the EPC 20 (MME 30) and is used to generate an encryption key of a user plane (including split bearers), and an encryption and security assurance key for the RRC layer.

Moreover, when the PDCP entity determining unit 120 determines to modify the setting location of the PDCP entity for the split bearer, the configuration notifying unit 130 can notify the gNB 100B of settings specifying so.

Specifically, the configuration notifying unit 130 notifies the gNB 100B of a modification instruction that instructs to modify the setting location of the PDCP entity to the gNB 100B.

The PDCP entity setting unit 140 performs various settings relating to the PDCP entity. Particularly, when it is determined to set the PDCP entity for the split bearer in the eNB 100A, the PDCP entity setting unit 140 sets the PDCP entity.

Moreover, based on the setting location of the PDCP entity notified from the gNB 100B, the PDCP entity setting unit 140 sets the protocol stack to be used for the split bearer. Specifically, the PDCP entity setting unit 140 sets the PDCP entity for the split bearer.

Furthermore, when the modification instruction for the PDCP entity for the split bearer is notified from the gNB 100B, the PDCP entity setting unit 140 can set the PDCP entity for the split bearer based on the notified modification instruction.

The bearer configuring unit 150 configures the MCG bearer and the split bearer. Specifically, the bearer configuring unit 150 configures the MCG bearer and the split bearer with the UE 200 by coordinating with the core network (EPC 20).

Moreover, the bearer configuring unit 150 releases the configured MCG bearer and the split bearer by coordinating with the core network (EPC 20).

The key managing unit 160 manages the security key used in the eNB 100A. Specifically, the key managing unit 160 acquires and manages the KeNB generated by the EPC 20 (MME 30). Moreover, the key managing unit 160 generates the security key (S-KeNB) for the gNB 100B by using the KeNB. The key managing unit 160 provides the generated S-KeNB to the configuration notifying unit 130.

(2.2) gNB 100B

Figure 4:
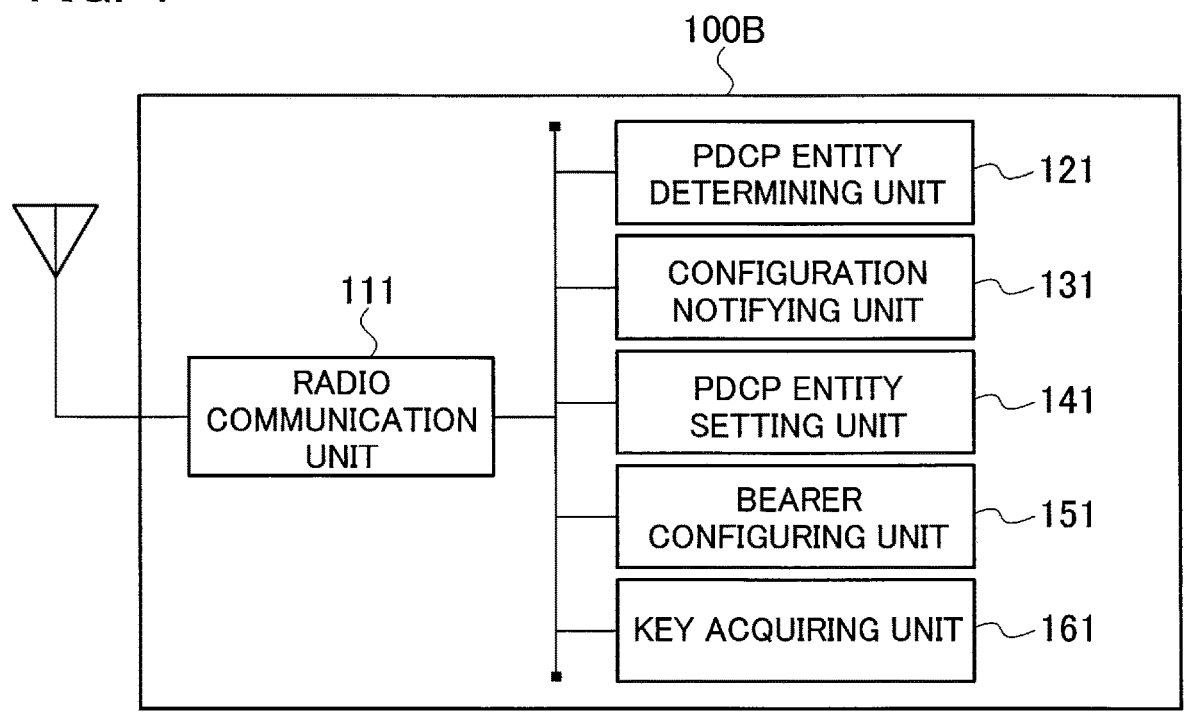
FIG. 4 is a functional block diagram of the gNB 100B.

FIG. 4 is a functional block diagram of the gNB 100B. As shown in FIG. 4, the gNB 100B includes a radio communication unit 111, a PDCP entity determining unit 121, a configuration notifying unit 131, a PDCP entity setting unit 141, a bearer configuring unit 151, and a key acquiring unit 161. In the following explanation, structural elements that are different from those of the functional block configuration of the eNB 100A are mainly explained, and explanation of the similar structural elements is omitted.

The radio communication unit 111, the PDCP entity determining unit 121, the configuration notifying unit 131, the PDCP entity setting unit 141, and the bearer configuring unit 151 respectively correspond to the radio communication unit 110, the PDCP entity determining unit 120, the configuration notifying unit 130, the PDCP entity setting unit 140, and the bearer configuring unit 150 of the eNB 100A.

The gNB 100B differs from the eNB 100A in that, because the gNB 100B is the secondary base station (SgNB), the gNB 100B acquires the security key (S-KeNB) from the eNB 100A. The key acquiring unit 161 acquires the security key notified from the eNB 100A.

Based on the setting location of the PDCP entity notified from the eNB 100A, the PDCP entity setting unit 141 sets the protocol stack to be used for the split bearer. In the present embodiment, the PDCP entity setting unit 141 constitutes a setting unit.

Moreover, the PDCP entity setting unit 141 configures the split bearer by using the security key (S-KeNB) notified from the eNB 100A.

Furthermore, when the modification instruction for the PDCP entity for the split bearer is notified from the eNB 100A, the PDCP entity setting unit 141 can set the PDCP entity for the split bearer based on the received modification instruction.

The PDCP entity determining unit 121 can determine to modify the setting location of the PDCP entity for the split bearer from the gNB 100B to the eNB 100A.

The bearer configuring unit 151 configures the split bearer. Specifically, the bearer configuring unit 151 configures the split bearer with the UE 200 by coordinating with the core network (NGC 25)

(3) Operation of Radio Communication System

Operation of the radio communication system 10 is explained below. Specifically, the configuration and changing operations for the split bearer (Split Bearer (PDCP@MeNB) or Split Bearer (PDCP@SgNB)) performed by the eNB 100A (MeNB) and the gNB 100B (SgNB) will be explained.

Specifically, an operation example based on an addition and changing sequence of the secondary cell group (SCG) stipulated in Chapter 10.1.2.8 of 3GPP TS36.300 (Dual Connectivity operation) will be explained.

Note that, the RRC layer message (RRC message) that is transmitted by the MeNB can be transmitted via the MCG bearer or the Split Bearer (PDCP@MeNB). Moreover, the RRC message transmitted by the SgNB can be forwarded to the MeNB, and the MeNB can transmit the message to the UE 200.

Alternatively, the SgNB can directly transmit the RRC message to the UE 200 via the SCG bearer. Alternatively, the SgNB can transmit the RRC message to the UE 200 via the Split Bearer (PDCP@SgNB).

(3.1) Operation Example 1

In the present operation example, an operation of setting the PDCP entity for the split bearer in the eNB 100A (MeNB), that is, an operation of configuring the Split Bearer (PDCP@MeNB) will be explained.

Figure 5:
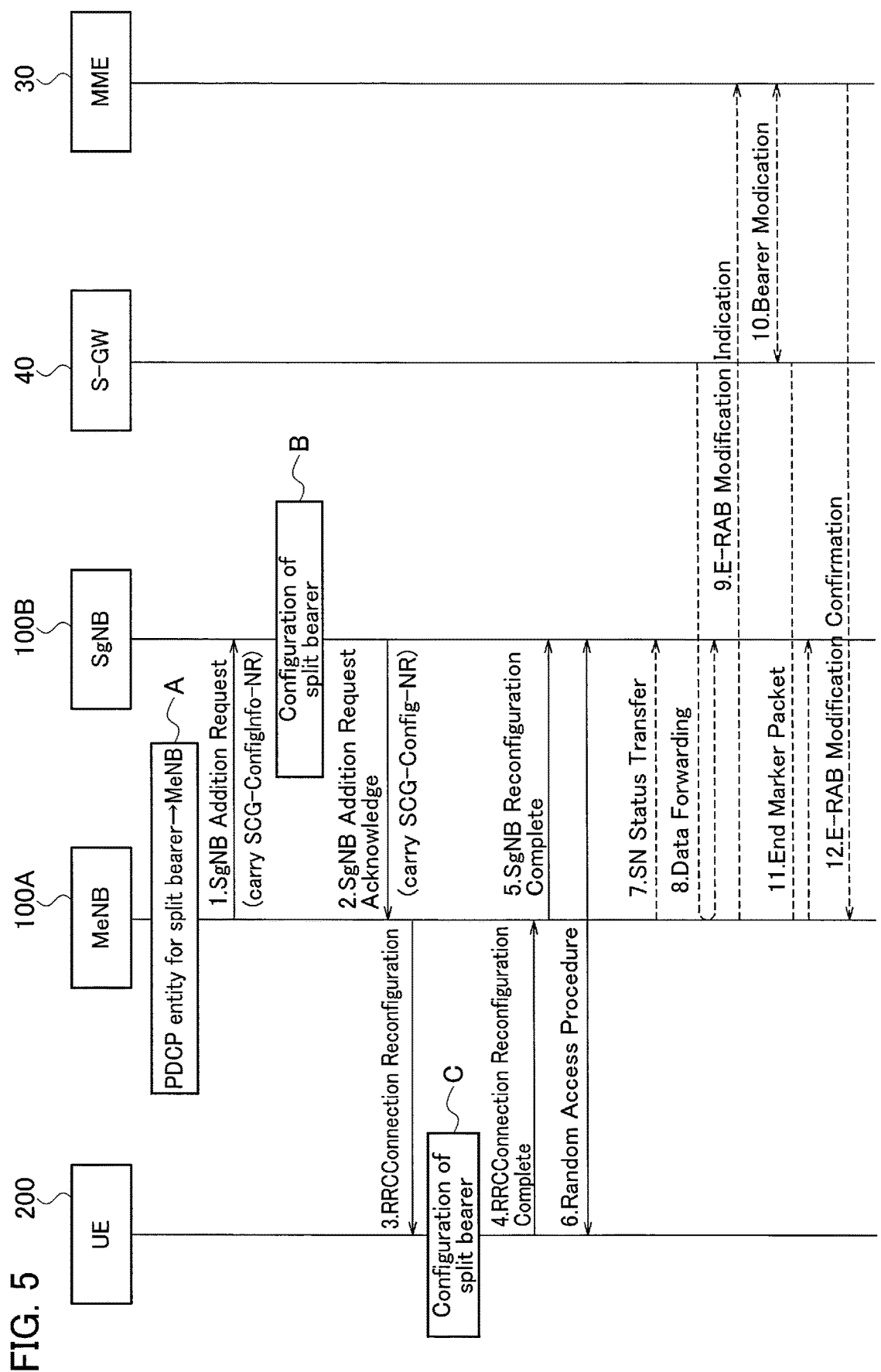
FIG. 5 is a diagram showing a setting sequence of a PDCP entity executed at the time of adding the gNB 100B (SgNB) (SgNB addition) (Operation Example 1).

FIG. 5 shows a setting sequence of the PDCP entity executed at the time of adding the gNB 100B (SgNB) (SgNB addition) for executing the dual connectivity. Steps that are different from that of the sequence explained in Chapter 10.1.2.8 of 3GPP TS36.300 (v14.2.0) will be mainly explained below.

As shown in FIG. 5, the eNB 100A determines to set the PDCP entity for the split bearer in the eNB 100A (see "A" in FIG. 5).

The eNB 100A notifies the gNB 100B of the determined setting location (eNB 100A) of the PDCP entity. Specifically, the eNB 100A transmits to the gNB 100B SCG-Configinfo-NR, that is, an RRC message that includes such settings (Step 1 in FIG. 5).

FIG. 12 shows a configuration example of the SCG-Configinfo-NR. As shown in FIG. 12, the SCG-Configinfo-NR includes a bearer type (drb-Type-r15) and the setting location of the PDCP entity (pdcp-Location-r15).

As the drb-Type-r15, the split bearer (split) or the SCG bearer (scg) can be specified. As the pdcp-Location-r15, the master cell group (mcg) or the secondary cell group (scg) can be specified.

The gNB 100B sets, based on the SCG-Configinfo-NR received from the eNB 100A, the protocol stack of the gNB 100B (see "B" in FIG. 5). Specifically, the gNB 100B performs the configuration (RLC-Config, MAC-MainConfig) of the split bearer (Split Bearer (PDCP@MeNB)) on the SgNB side.

The gNB 100B notifies the eNB 100A of configuration contents of the split bearer on the SgNB side. Specifically, the gNB 100B transmits to the eNB 100A SCG-Config-NR, an RRC message that includes the contents (Step 2 in FIG. 5).

FIG. 13 shows a configuration example of the SCG-Config-NR. As shown in FIG. 13, similar to the SCG-Configinfo-NR, the SCG-Config-NR includes the drb-Type-r15 and the pdcp-Location-r15.

Subsequently, the eNB 100A configures the split bearer with the UE 200 (Step 3 in FIG. 5). As explained above, the UE 200 configures the split bearer by using a single PDCP entity (see FIGS. 2A and 2B) that is commonly set for a plurality of the split bearers.

Specifically, the eNB 100A configures with the UE 200 PDCP-Config generated by the eNB 100A. Moreover, the eNB 100A configures with the UE 200 RLC-Config and MAC-MainConfig of the MeNB generated by the eNB 100A, and RLC-Config and MAC-MainConfig of the SgNB generated by the gNB 100B. Accordingly, the configuration of the split bearer in the UE 200 is completed (see "C" in FIG. 5).

(3.2) Operation Example 2

In the present operation example, an operation of setting the PDCP entity for the split bearer in the gNB 100B (SgNB), that is, an operation of configuring the Split Bearer (PDCP@SgNB) will be explained.

Figure 6:
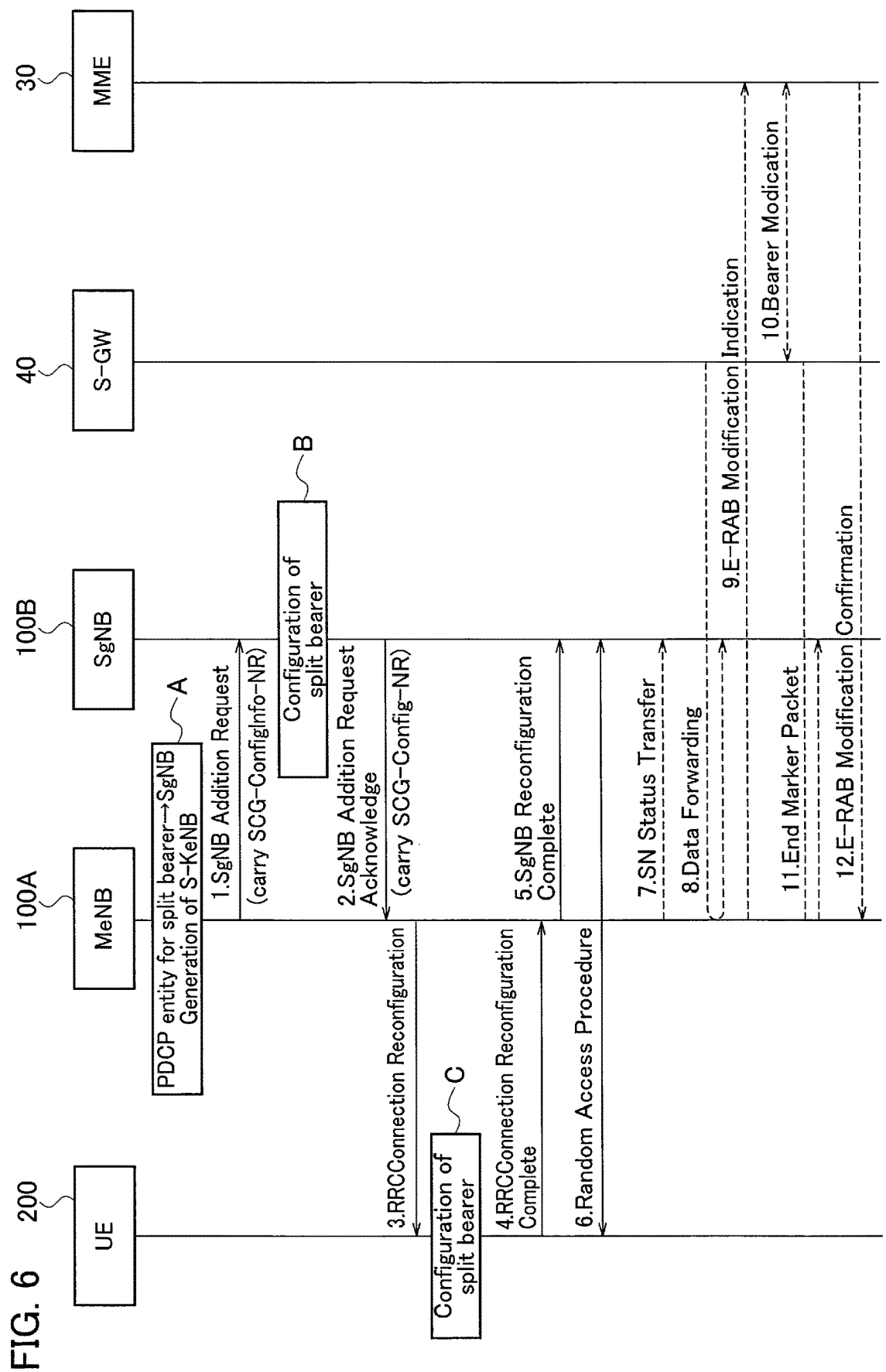
FIG. 6 is a diagram showing another setting sequence of the PDCP entity executed at the time of adding the gNB 100B (SgNB) (SgNB addition) (Operation Example 2).

FIG. 6 shows another setting sequence of the PDCP entity executed at the time of adding the gNB 100B (SgNB) (SgNB addition) to execute the dual connectivity. Steps that are different from that of the sequence explained in Operation Example 1 will be mainly explained below.

The eNB 100A determines to set the PDCP entity for the split bearer in the gNB 100B (see "A" in FIG. 6). The eNB 100A generates the S-KeNB to be used in the gNB 100B. The generated S-KeNB is used in encryption (concealing) and the like of the user plane and a control plane transmitted/received by the gNB 100B.

The eNB 100A notifies the gNB 100B of the determined setting location (gNB 100B) of the PDCP entity. Moreover, the eNB 100A notifies the gNB 100B of the generated S-KeNB (Step 1 in FIG. 6).

The gNB 100B performs the configuration (RLC-Config, MAC-MainConfig, and PDCP-Config) of the split bearer (Split Bearer (PDCP@MeNB)) on the SgNB side.

Subsequently, the eNB 100A configures the split bearer with the UE 200 (Step 3 in FIG. 6). Specifically, the eNB 100A configures with the UE 200 the PDCP-Config generated by the gNB 100B. Moreover, the eNB 100A configures with the UE 200 the RLC-Config and MAC-MainConfig of the MeNB generated by the eNB 100A, and the RLC-Config and MAC-MainConfig of the SgNB generated by the gNB 100B. Accordingly, the configuration of the split bearer in the UE 200 is completed (see "C" in FIG. 6).

(3.3) Operation Example 3

In the present operation example, similar to Operation Example 1, an operation of setting the PDCP entity for the split bearer is set in the eNB 100A (MeNB), that is, an operation of configuring the split bearer (PDCP@SgNB) will be explained. The present operation example differs from the Operation Example 1 in that, instead of the SgNB addition, the sequence includes a scenario in which the MeNB modifies the settings of the SCG (MeNB Initiated SCG modification).

The MeNB Initiated SCG modification is executed at the time when the MeNB configures a new split bearer, or modifies the already set PDCP entity for the split bearer from the SgNB to the MeNB.

Figure 7:
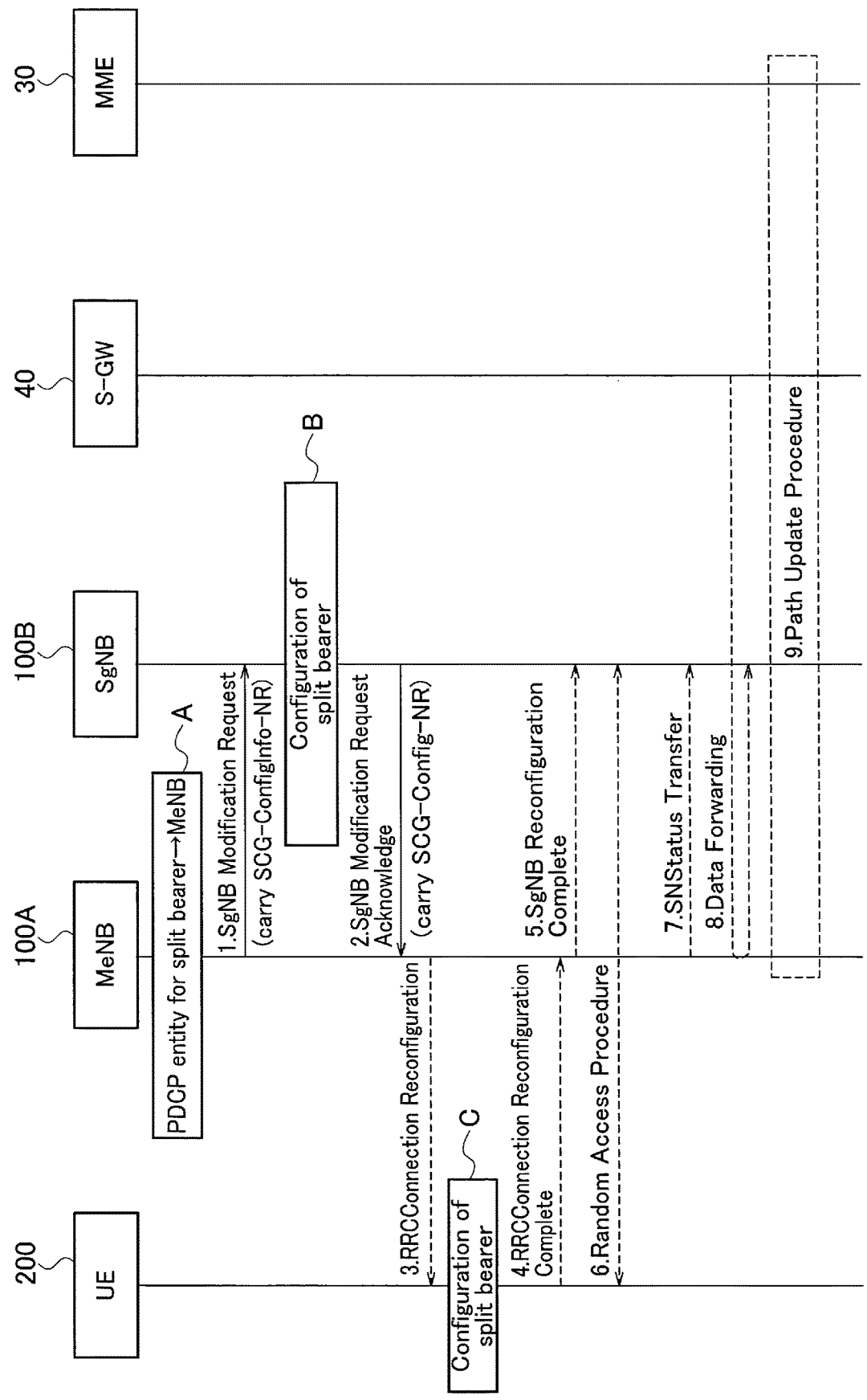
FIG. 7 is a diagram showing a setting sequence of the PDCP entity executed at the time of modifying a configuration of a split bearer on the gNB 100B (SgNB) side (MeNB Initiated SCG modification) (Operation Example 3).

FIG. 7 shows a setting sequence of the PDCP entity executed at the time of modifying the configuration of the split bearer on the gNB 100B (SgNB) side (MeNB Initiated SCG modification). Steps that are different from that of the sequence explained in Operation Example 1 will be mainly explained below.

As shown in FIG. 7, the present operation example differs from Operation Example 1 in that, in the present operation example, the message exchanged between the eNB 100A and the gNB 100B is SgNB Modification Request/SgNB Modification Request Acknowledge. The remaining steps of the sequence relating to the configuration of the split bearer are the same as that of the sequence explained in Operation Example 1 (see "A" to "C" in FIG. 7).

(3.4) Operation Example 4

In the present operation example, similar to Operation Example 2, an operation of setting the PDCP entity for the split bearer in the gNB 100B (SgNB), that is, an operation of configuring the split bearer (PDCP@SgNB) will be explained. The present operation example, too, differs from Operation Example 1 in that, instead of the SgNB addition, the sequence includes a scenario in which the MeNB modifies the settings of the SCG (MeNB Initiated SCG modification).

Similar to Operation Example 3, the MeNB Initiated SCG modification is executed at the time when the MeNB configures a new split bearer, or modifies the already set PDCP entity for the split bearer from the MeNB to the SgNB.

Figure 8:
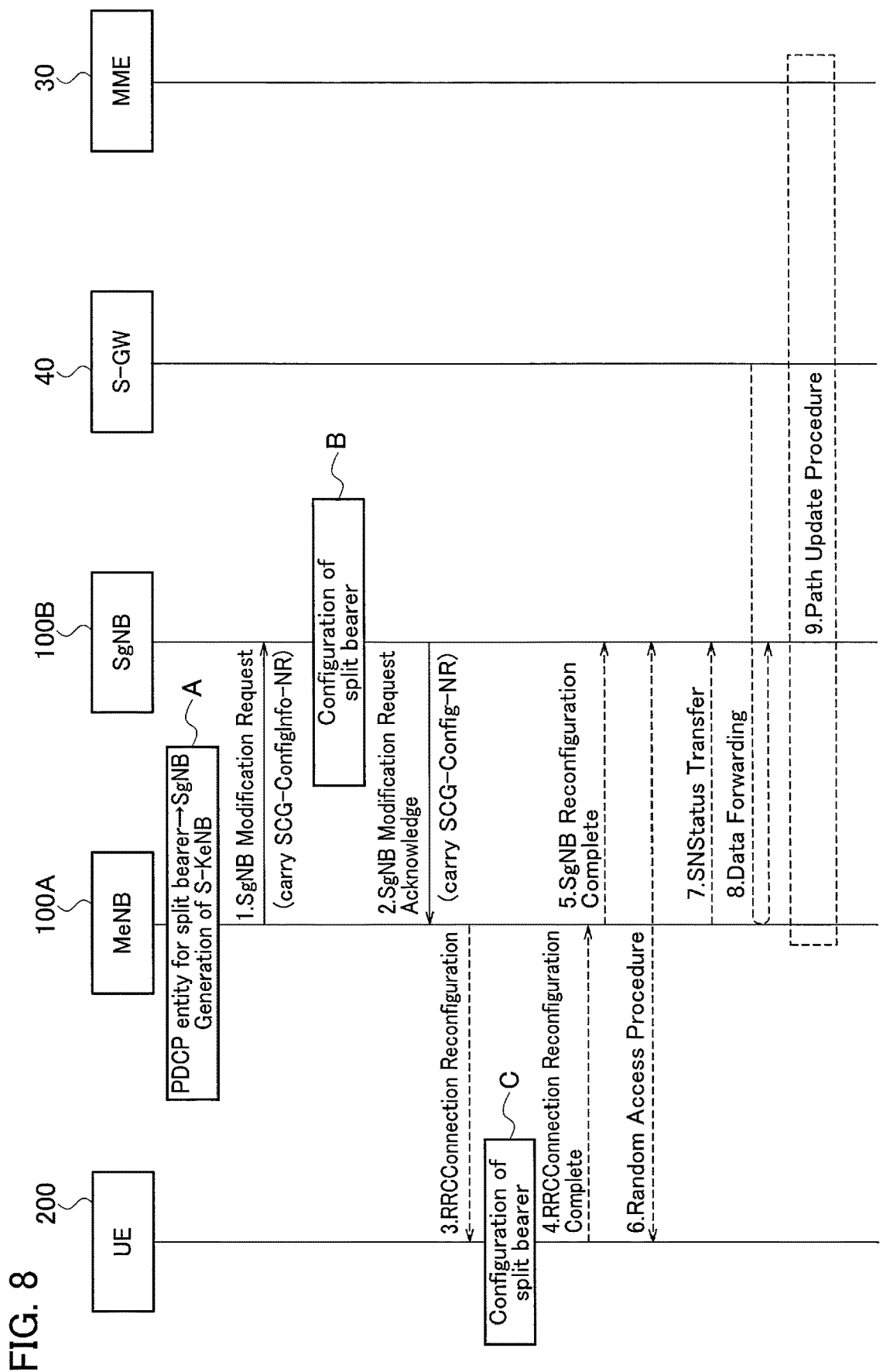
FIG. 8 is a diagram showing another setting sequence of the PDCP entity executed at the time of modifying the configuration of the split bearer on the gNB 100B (SgNB) side (MeNB Initiated SCG modification) (Operation Example 4).

FIG. 8 shows another setting sequence of the PDCP entity executed at the time of modifying the configuration of the split bearer on the gNB 100B (SgNB) side (MeNB Initiated SCG modification). Steps that are different from that of the sequence explained in Operation Example 2 will be mainly explained below.

As shown in FIG. 8, the present operation example differs from Operation Example 2 in that, in the present operation example, the message exchanged between the eNB 100A and the gNB 100B is the SgNB Modification Request/the SgNB Modification Request Acknowledge. The remaining steps of the sequence relating to the configuration of the split bearer are the same as that of the sequence explained in Operation Example 2 (see "A" to "C" in FIG. 8).

(3.5) Operation Example 5

In the present operation example, similar to Operation Example 4, an operation of setting the PDCP entity for the split bearer in the gNB 100B (SgNB), that is, an operation of configuring the split bearer (PDCP@SgNB) will be explained. The present operation example differs from Operation Example 4 in that, instead of the MeNB, the SgNB determines the setting location of the PDCP entity (SgNB Initiated SCG modification).

In the present operation example, the SgNB Initiated SCG modification is executed at the time when the SgNB configures a new split bearer, or modifies the already set PDCP entity for the split bearer from the MeNB to the SgNB.

Figure 9:
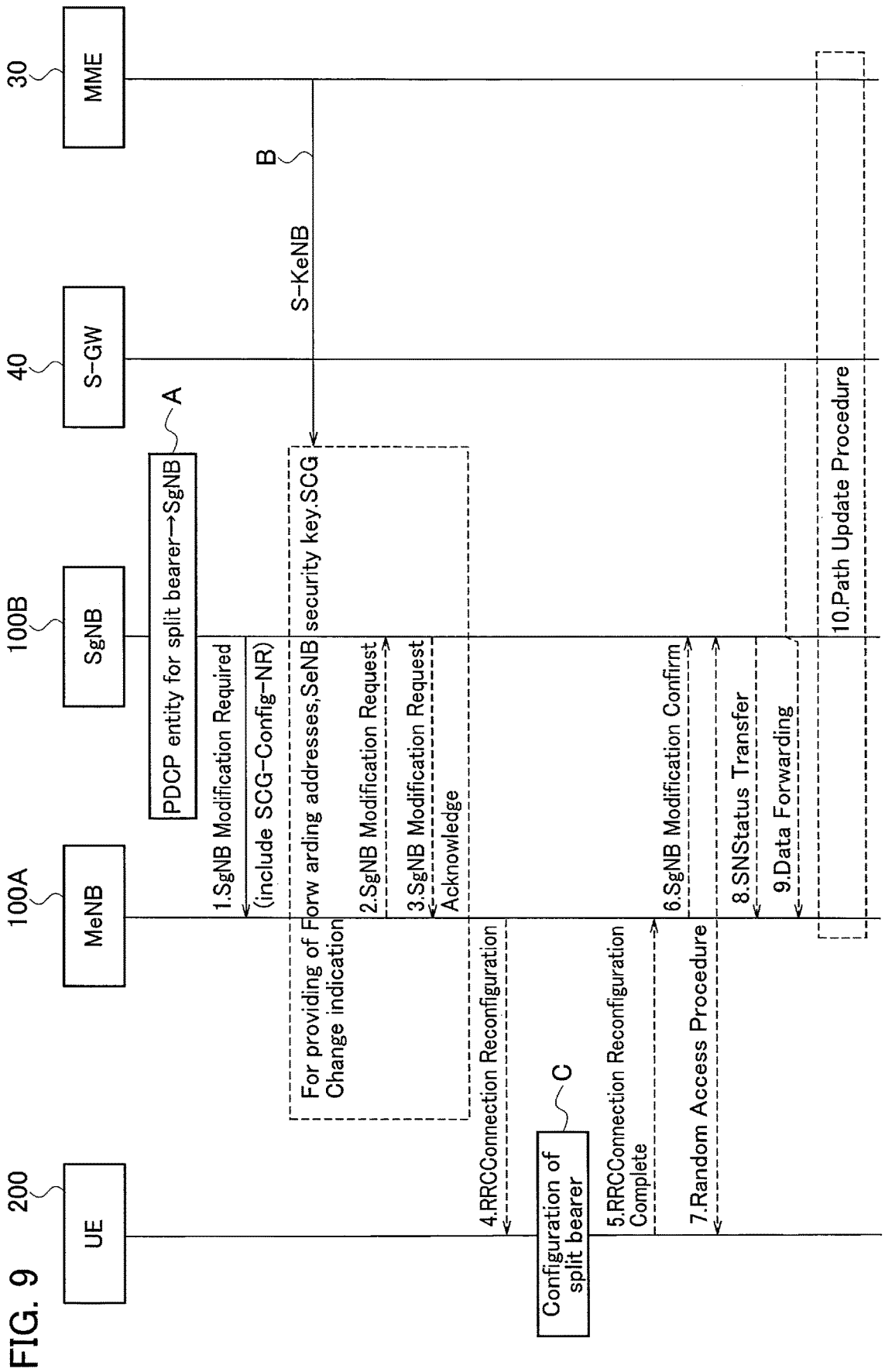
FIG. 9 is a diagram showing still another setting sequence of the PDCP entity executed at the time of modifying the configuration of the split bearer on the gNB 100B (SgNB) side (SgNB Initiated SCG modification) (Operation Example 5).

FIG. 9 shows still another setting sequence of the PDCP entity executed at the time of modifying the configuration of the split bearer on the gNB 100B (SgNB) side (SgNB Initiated SCG modification). Steps that are different from that of the sequences explained in Operation Example 2 and 4 will be mainly explained below.

As shown in FIG. 9, the gNB 100B determines to set the PDCP entity for the split bearer in the gNB 100B (see "A" in FIG. 9).

The gNB 100B notifies the eNB 100A of the configuration contents of the split bearer on the SgNB side. Specifically, the gNB 100B notifies the eNB 100A of the contents of the RLC-Config, MAC-MainConfig and PDCP-Config of the split bearer (Split Bearer (PDCP@SgNB)) on the SgNB side. For performing this notification operation, similar to the operation examples explained above, the SCG-Config-NR is used.

Moreover, in the present operation example, the gNB 100B directly acquires the S-KeNB from the MME 30, and instead of the eNB 100A (see "B" in FIG. 9).

Subsequently, the eNB 100A configures the split bearer with the UE 200 (Steps 2 and 3 in FIG. 9). Specifically, the eNB 100A configures with the UE 200 the PDCP-Config generated by the gNB 100B. Moreover, the eNB 100A configures with the UE 200 the RLC-Config and MAC-MainConfig of the MeNB generated by the eNB 100A, and the RLC-Config and MAC-MainConfig of the SgNB generated by the gNB 100B. Accordingly, the configuration of the split bearer in the UE 200 is completed (see "C" in FIG. 9).

(3.6) Operation Example 6

In the present operation example, an operation of setting the PDCP entity for the split bearer in the eNB 100A (MeNB), that is, an operation of configuring the Split Bearer (PDCP@MeNB) will be explained. The present operation example differs from Operation Example 3 in that, instead of the MeNB, the SgNB determines the setting location of the PDCP entity (SgNB Initiated SCG modification).

In the present operation example, the SgNB Initiated SCG modification is executed at the time when the SgNB configures a new split bearer, or modifies the already set PDCP entity for the split bearer from the SgNB to the MeNB.

Figure 10:
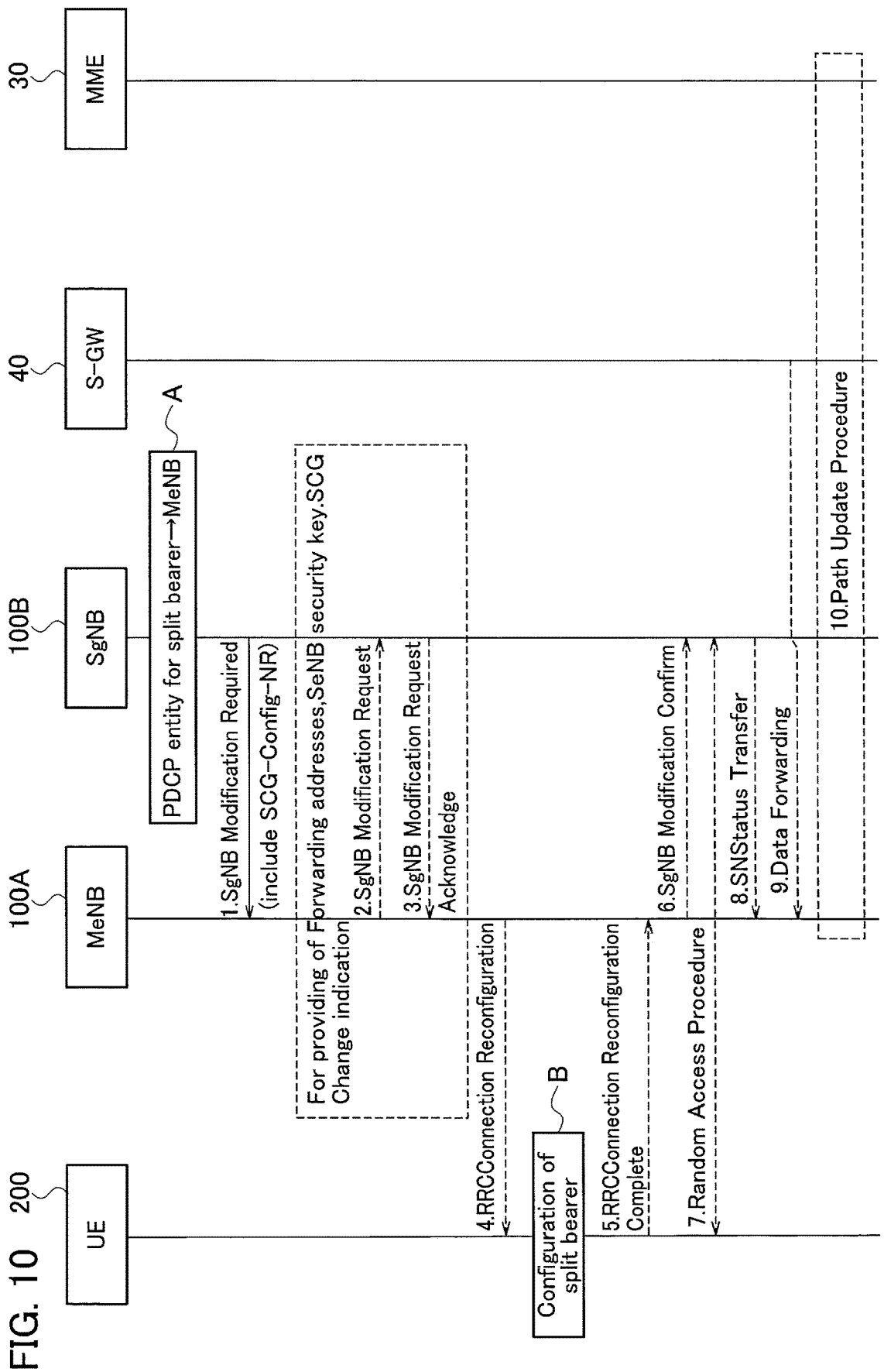
FIG. 10 is a diagram showing a setting sequence of the PDCP entity executed at the time of modifying a configuration of a split bearer on the eNB 100A (MeNB) side (SgNB Initiated SCG modification) (Operation Example 6).

FIG. 10 shows a setting sequence of the PDCP entity executed at the time of modifying the configuration of the split bearer on the eNB 100A (MeNB) side (SgNB Initiated SCG modification). Steps that are different from that of the sequence explained in Operation Example 5 will be mainly explained below.

As shown in FIG. 10, the gNB 100B determines to set the PDCP entity for the split bearer in the eNB 100A (see "A" in FIG. 10).

The gNB 100B notifies the eNB 100A of the contents of the RLC-Config and MAC-MainConfig of the split bearer (Split Bearer (PDCP@MeNB)) on the SgNB side. Furthermore, in the present operation example, because the eNB 100A that sets the PDCP entity for the split bearer uses the KeNB retained by the eNB 100A, the gNB 100B need not acquire the S-KeNB from the MME 30 as explained in Operation Example 5.

Subsequently, the eNB 100A configures the split bearer with the UE 200 (Steps 2 and 3 in FIG. 10). Specifically, the eNB 100A configures with the UE 200 the PDCP-Config generated by the gNB 100B. Moreover, the eNB 100A configures with the UE 200 the PDCP-Config generated by the eNB 100A. Moreover, the eNB 100A configures with the UE 200 the RLC-Config and MAC-MainConfig of the MeNB generated by the eNB 100A, and the RLC-Config and MAC-MainConfig of the SgNB generated by the gNB 100B. Accordingly, the configuration of the split bearer in the UE 200 is completed (see "B" in FIG. 10).

(3.7) Operation Example 7

In the present operation example, an operation of modifying the setting location of the PDCP entity on the radio base station side between the MeNB and the SgNB without modifying the configuration of the UE 200 will be explained.

Specifically, in the present operation example, the configuration of the split bearer at the UE 200, in other words, the PDCP-Config, the RLC-Config of the MeNB (LTE) and the SgNB (NR), and the MAC-MainConfig of the MeNB (LTE) and the SgNB (NR) are maintained without any modification. On the other hand, the PDCP entity on the radio base station side is modified (relocated) from the MeNB to the SgNB or from the SgNB to the MeNB.

Figure 11:
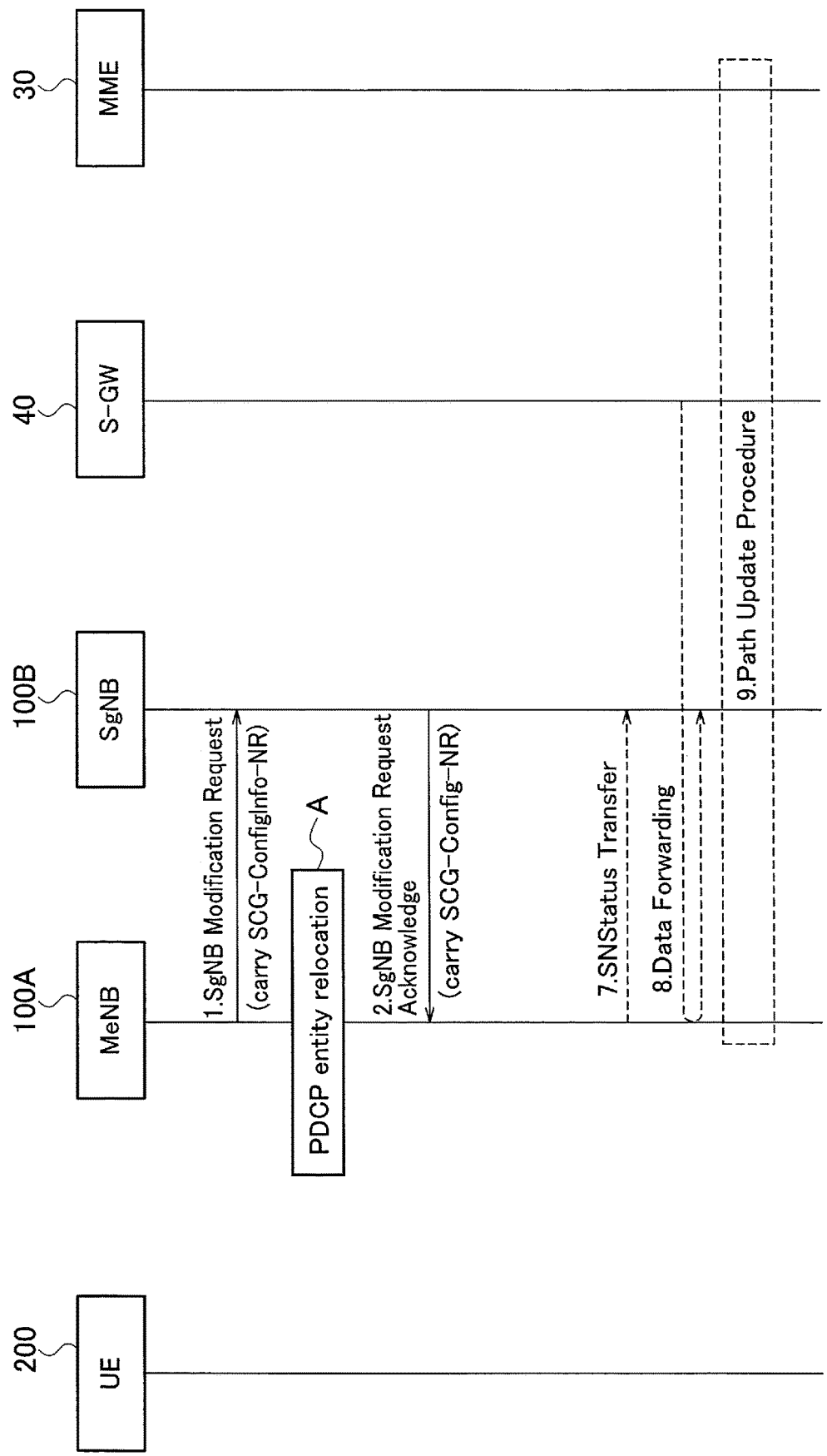
FIG. 11 is a diagram showing a sequence in which the PDCP entity is modified from the MeNB to the SgNB (Operation Example 7).

FIG. 11 shows a sequence in which the PDCP entity is modified from the MeNB to the SgNB. As shown in FIG. 11, the eNB 100A determines to relocate the PDCP entity from the MeNB to the SgNB (see "A" in FIG. 11). FIG. 11 shows an example in which the relocation is executed in the MeNB Initiated SCG modification, in the same manner as that in Operation Example 1 and the like explained above.

The relocation is executed only between the eNB 100A and the gNB 100B, and is hidden from the UE 200.

Once the relocation is completed, a path on the user plane is switched to the SgNB side during Path Update Procedure (Step 9 in FIG. 11).

(4) Effects and Advantages

According to the present embodiment, the following effects and advantages can be obtained. Specifically, for example, the eNB 100A notifies the gNB 100B of the determined setting location of the PDCP entity, and the gNB 100B sets, based on the notified setting location of the PDCP entity (eNB 100A or gNB 100B), the protocol stack to be used in the split bearer (Split Bearer (PDCP@MeNB) or Split Bearer (PDCP@SgNB)).

Accordingly, even when the Split bearer via MCG and the Split bearer via SCG are integrated, and are stipulated as a unified split bearer, a split bearer can be appropriately configured on the radio access network, specifically, on the side of the eNB 100A and the gNB 100B.

In the present embodiment, at the time of setting the PDCP entity in the gNB 100B, the eNB 100A notifies the gNB 100B of the security key (S-KeNB). Therefore, even when the gNB 100B sets the PDCP entity for the split bearer, the user plane and the control plane transmitted/received by the gNB 100B can be encrypted (concealed).

In the present embodiment, the eNB 100A and the gNB 100B can modify (relocate) the setting location of the PDCP entity. Because the relocation is executed only between the eNB 100A and the gNB 100B and is hidden from the UE 200, the setting location of the PDCP entity can be flexibly modified without impacting the operation of the UE 200 in any way.

(5) Other Embodiments

Although the contents of the present invention have been explained above by using the embodiments, it is obvious for a person skilled in the art that the present invention is not limited to those embodiments and that various modifications and improvements thereof are possible.

For example, in the embodiments explained above, examples in which the eNB 100A is the master base station and the gNB 100B is the secondary base station have been cited, but this configuration can be reversed. In other words, the gNB 100B can be the master base station and the eNB 100A can be the secondary base station.

Moreover, among the protocol stacks shown in FIGS. 2A and 2B, even though the protocol stack for the SCG bearer is not shown, the protocol stack for the SCG bearer can be independently provided. Alternatively, the SCG bearer can be included and can be used as the split bearer.

Furthermore, the block diagrams used for explaining the embodiments (FIGS. 3 and 4) show functional blocks. Those functional blocks (structural components) can be realized by a desired combination of hardware and/or software. Means for realizing each functional block is not particularly limited. That is, each functional block may be realized by one device combined physically and/or logically. Alternatively, two or more devices separated physically and/or logically may be directly and/or indirectly connected (for example, wired and/or wireless) to each other, and each functional block may be realized by these plural devices.

Figure 14:
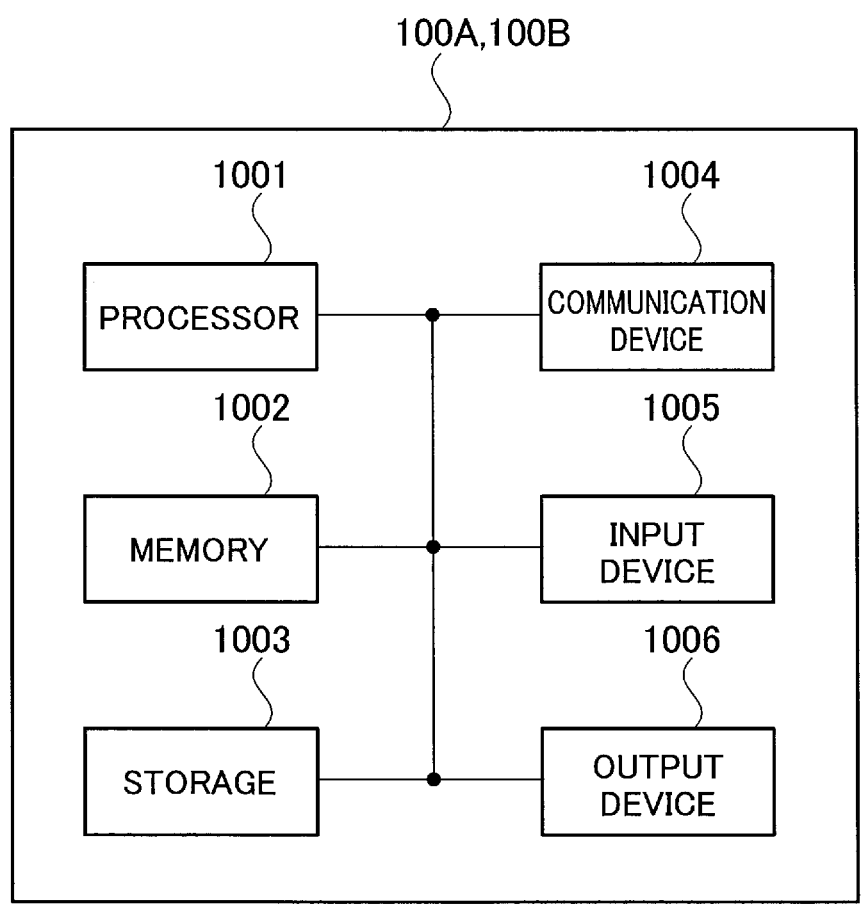
FIG. 14 is a diagram showing an example of a hardware configuration of the eNB 100A and the gNB 100B.

Furthermore, the eNB 100A and the gNB 100B (devices) explained above can function as a computer that performs the processing of the present invention. FIG. 14 is a diagram showing an example of a hardware configuration of the devices. As shown in FIG. 14, each of the devices can be configured as a computer device including a processor 1001, a memory 1002, a storage 1003, a communication device 1004, an input device 1005, an output device 1006, and a bus 1007.

The functional blocks of the devices (see FIGS. 3 and 4) can be realized by any of hardware elements of the computer device or a desired combination of the hardware elements.

The processor 1001, for example, operates an operating system to control the entire computer. The processor 1001 can be configured with a central processing unit (CPU) including an interface with a peripheral device, a control device, a computing device, a register, and the like.

The memory 1002 is a computer readable recording medium and is configured, for example, with at least one of ROM (Read Only Memory), EPROM (Erasable Programmable ROM), EEPROM (Electrically Erasable Programmable ROM), RAM (Random Access Memory), and the like. The memory 1002 can be called register, cache, main memory (main memory), and the like. The memory 1002 can store therein a computer program (computer program codes), software modules, and the like that can execute the method according to the above embodiments.

The storage 1003 is a computer readable recording medium. Examples of the storage 1003 include an optical disk such as CD-ROM (Compact Disc ROM), a hard disk drive, a flexible disk, a magneto-optical disk (for example, a compact disk, a digital versatile disk, a Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network.

The communication device 1004 is also called, for example, a network device, a network controller, a network card, a communication module, and the like.

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

In addition, the manner of notification of information is not limited to the one explained in the embodiments, and the notification may be performed in other manner. For example, the notification of information can be performed by physical layer signaling (for example, DCI (Downlink Control Information), UCI (Uplink Control Information)), upper layer signaling (for example, RRC signaling, MAC (Medium Access Control) signaling, notification information (MIB (Master Information Block), SIB (System Information Block)), other signals, or a combination thereof. In addition, the RRC signaling can be called an RRC message, and the RRC signaling can be, for example, an RRC Connection Setup message, an RRC Connection Reconfiguration message, and the like.

Furthermore, the input/output information can be stored in a specific location (for example, a memory) or can be managed in a management table. The information to be input/output can be overwritten, updated, or added. The information can be deleted after outputting. The inputted information can be transmitted to another device.

The order of the sequences, flowcharts, and the like in the embodiments can be rearranged unless there is a contradiction.

Moreover, in the embodiments explained above, the specific operations performed by the eNB 100A (gNB 100B, hereinafter the same) can be performed by another network node (device). Moreover, functions of the eNB 100A can be provided by combining a plurality of other network nodes.

Moreover, the terms used in this specification and/or the terms necessary for understanding the present specification can be replaced with terms having the same or similar meanings. For example, a channel and/or a symbol can be replaced with a signal (signal) if that is stated. Also, the signal can be replaced with a message. Moreover, the terms "system" and "network" can be used interchangeably.

Furthermore, the used parameter and the like can be represented by an absolute value, can be expressed as a relative value from a predetermined value, or can be represented by corresponding other information. For example, the radio resource can be indicated by an index.

The eNB 100A (base station) can accommodate one or more (for example, three) cells (also called sectors). In a configuration in which the base station accommodates a plurality of cells, the entire coverage area of the base station can be divided into a plurality of smaller areas. In each such a smaller area, communication service can be provided by abase station subsystem (for example, a small base station for indoor use RRH: Remote Radio Head).

The term "cell" or "sector" refers to a part or all of the coverage area of a base station and/or a base station subsystem that performs communication service in this coverage. In addition, the terms "base station" "eNB", "cell", and "sector" can be used interchangeably in the present specification. The base station can also be referred to as a fixed station, Node B, eNode B (eNB), gNode B (gNB), an access point, a femtocell, a small cell, and the like.

The UE 200 is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

As used herein, the phrase "based on" does not mean "based only on" unless explicitly stated otherwise. In other words, the phrase "based on" means both "based only on" and "based at least on".

Furthermore, the terms "including", "comprising", and variants thereof are intended to be inclusive in a manner similar to "having". Furthermore, the term "or" used in the specification or claims is intended not to be an exclusive disjunction.

Any reference to an element using a designation such as "first", "second", and the like used in the present specification generally does not limit the amount or order of those elements. Such designations can be used in the present specification as a convenient way to distinguish between two or more elements. Thus, the reference to the first and second elements does not imply that only two elements can be adopted, or that the first element must precede the second element in some or the other manner.

Throughout the present specification, for example, during translation, if articles such as a, an, and the in English are added, these articles shall include plurality, unless it is clearly indicated that it is not so according to the context.

As described above, the details of the present invention have been disclosed by using the embodiments of the present invention. However, the description and drawings which constitute part of this disclosure should not be interpreted so as to limit the present invention. From this disclosure, various alternative embodiments, examples, and operation techniques will be apparent to a person skilled in the art.

INDUSTRIAL APPLICABILITY

The radio communication system and the radio communication method according to the above-mentioned embodiments are useful in that it is possible to appropriately configure a split bearer in a radio access network even if Split bearer via MCG and Split bearer via SCG are integrated and stipulated as a unified split bearer.

EXPLANATION OF REFERENCE NUMERALS 10 radio communication system
20 EPC
25 NGC
30 MME
40 SGW
100A eNB
100B gNB
110, 111 radio communication unit
120, 121 PDCP entity determining unit
130, 131 configuration notifying unit
140, 141 PDCP entity setting unit
150, 151 bearer configuring unit
160 key managing unit 161 key acquiring unit
200 UE
1001 processor
1002 memory
1003 storage
1004 communication device
1005 input device
1006 output device
1007 bus

The invention claimed is:

1. A radio base station, comprising: a determining unit that determines a setting location of a PDCP entity that is a packet data convergence protocol layer entity used for a split bearer; and a notifying unit that notifies another radio base station of the setting location of the PDCP entity, wherein the setting location specifies whether the PDCP entity is set in either an MN (Master Node) served by the radio base station or in an SN (Secondary Node) served by the other radio base station, different from the setting location of the MN, wherein the determining unit determines to modify the setting location of the PDCP entity from the radio base station to the other radio base station, and wherein the notifying unit notifies the other radio base station of a modification instruction that instructs to modify the setting location of the PDCP entity to the other radio base station.

2. The radio base station as claimed in claim 1, wherein when it is determined that the PDCP entity is to be set in the other radio base station, the notifying unit notifies the other radio base station of a security key to be used in the other radio base station.

3. The radio base station as claimed in claim 1, further comprising:
    a transmitting unit that transmits to a user device a PDCP parameter used for the split bearer based on the setting location.

4. A radio communication method in a base station, comprising: determining a setting location of a PDCP entity that is a packet data convergence protocol layer entity used for a split bearer; notifying another radio base station of the setting location of the PDCP entity, wherein the setting location specifies whether the PDCP entity is set in either an MN (Master Node) served by the radio base station or in an SN (Secondary Node) served by the other radio base station, different from the setting location of the MN; determining to modify the setting location of the PDCP entity from the radio base station to the other radio base station; and notifying the other radio base station of a modification instruction that instructs to modify the setting location of the PDCP entity to the other radio base station.

5. The radio base station as claimed in claim 1, wherein a Secondary gNodeB (SgNB) Modification Request includes the modification instruction, the SgNB Modification Request being a message transmitted from the MN to the SN.

6. The radio communication method as claimed in claim 4, wherein a Secondary gNodeB (SgNB) Modification Request includes the modification instruction, the SgNB Modification Request being a message transmitted from the MN to the SN.

7. The radio base station as claimed in claim 1, wherein the MN and the SN are different types of radio access networks.

8. The radio communication method as claimed in claim 4, wherein the MN and the SN are different types of radio access networks.

* * * * *